United States Patent
Zhou

(10) Patent No.: US 10,712,494 B2
(45) Date of Patent: Jul. 14, 2020

(54) BACKLIGHT MODULE AND DISPLAY DEVICE

(71) Applicant: WUHAN CHINA STAR OPTOELECTRONICS TECHNOLOGY CO., LTD., Wuhan, Hubei (CN)

(72) Inventor: Gege Zhou, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 16/093,663

(22) PCT Filed: Sep. 25, 2018

(86) PCT No.: PCT/CN2018/107415
§ 371 (c)(1),
(2) Date: Oct. 15, 2018

(87) PCT Pub. No.: WO2019/205480
PCT Pub. Date: Oct. 31, 2019

(65) Prior Publication Data
US 2019/0331846 A1    Oct. 31, 2019

(30) Foreign Application Priority Data
Apr. 25, 2018  (CN) .......................... 2018 1 0376269

(51) Int. Cl.
*F21V 8/00* (2006.01)
*G02F 1/1333* (2006.01)

(52) U.S. Cl.
CPC ......... *G02B 6/0088* (2013.01); *G02B 6/0055* (2013.01); *G02B 6/0083* (2013.01); *G02B 6/0091* (2013.01); *G02F 1/133308* (2013.01)

(58) Field of Classification Search
None
See application file for complete search history.

(56) References Cited

U.S. PATENT DOCUMENTS

| | | | |
|---|---|---|---|
| 9,588,274 B2 * | 3/2017 | Zhou | ........................ F21V 17/16 |
| 2014/0176870 A1 | 6/2014 | Matsumoto et al. | |
| 2015/0177451 A1 | 6/2015 | Kang et al. | |
| 2018/0101062 A1 * | 4/2018 | Qiu | .................... G02F 1/133603 |

FOREIGN PATENT DOCUMENTS

| | | |
|---|---|---|
| CN | 104730766 A | 6/2015 |
| CN | 104832837 A | 8/2015 |
| CN | 105044983 A | 11/2015 |
| CN | 105223733 A | 1/2016 |
| CN | 10644151 A | 2/2017 |
| KR | 101292585 B1 | 8/2013 |

* cited by examiner

*Primary Examiner* — Ashok Patel
(74) *Attorney, Agent, or Firm* — Mark M. Friedman

(57) ABSTRACT

The present invention discloses a backlight module and a display device. The display device includes a liquid crystal box and a backlight module. The backlight module includes a backplate, a reflective plate, a light guiding plate, an optical film, a supporting block, a light bar, and a light bar circuit board. The backplate, the reflective plate, the light guiding plate, and the optical film are overlapped in order. The supporting block is disposed on an edge portion of the backplate for supporting the liquid crystal box. The present invention is capable of reducing width of bezel areas of the backlight module and fulfilling a slim bezel configuration.

2 Claims, 1 Drawing Sheet

BACKLIGHT MODULE AND DISPLAY DEVICE

CROSS REFERENCE TO RELATED APPLICATIONS

This application is a U.S. National Phase application submitted under 35 U.S.C. § 371 of Patent Cooperation Treaty Application serial No. PCT/CN2018/107415, filed Sep. 25, 2018, which claims the priority of China Patent Application serial No. 201810376269.8, filed Apr. 25, 2018, the disclosures of which are incorporated herein by reference in their entirety.

BACKGROUND OF INVENTION

1. Field of Invention

The present invention relates to displaying, and particularly to a backlight module and a display device.

2. Related Art

Conventional backlight modules are utilized to provide light sources for liquid crystal boxes. Conventional backlight modules are categorized into edge-lit backlight modules and direct-lit backlight modules.

With respect to edge-lit backlight modules, light sources are disposed on side portions inside the edge-lit backlight modules. Edge portions of backplates of the edge-lit backlight modules are provided with block walls. Plastic frames are disposed on inner sides of the block walls, and the plastic frames are provided for supporting liquid crystal boxes which are to be integrally assembled with the edge-lit backlight modules.

The block walls and the plastic frames take up a certain space in backlight modules. As a result, edge frame areas of conventional backlight modules (corresponding to areas of the block walls and the plastic frame) are required to have a large width, and such a large width is not beneficial to slim bezel design of display devices.

Therefore, it is necessary to provide new technical solutions to overcome the problems existing in the conventional technologies.

SUMMARY OF INVENTION

An object of the present invention is to provide a backlight module and a display device, which is capable of reducing width of bezel areas of the backlight module, whereby fulfilling a slim bezel configuration.

To achieve the above-mentioned object, The backlight module of the present invention comprises: a backplate; a reflective plate disposed on the backplate; a light guiding plate disposed on the reflective plate; an optical film disposed on the light guiding plate; a supporting block detachably attached to an edge portion of the backplate, the supporting block provided for supporting a liquid crystal box which is to be integrally assembled with the backlight module; a light bar provided between the light guiding plate and the supporting block; a light bar circuit board electrically connected with the light bar for controlling illumination of the light bar; the supporting block attached to the edge portion of the backplate though an adhesive; the light bar circuit board disposed on the edge portion of the backplate, and the supporting block disposed on the light bar circuit board; the supporting block and the backplate cooperatively forming a semi-closed chamber, where the reflective plate, the light guiding plate, the optical film, the light bar, and the light bar circuit board are disposed in the chamber; and the reflective plate disposed on an inner surface of the backplate.

In the backlight module, at least a portion of the light bar circuit board is disposed on the supporting block, and at least another portion of the light bar circuit board is disposed on the light guiding plate.

A backlight module comprises a backplate; a reflective plate disposed on the backplate; a light guiding plate disposed on the reflective plate; an optical film disposed on the light guiding plate; a supporting block detachably attached to an edge portion of the backplate, the supporting block provided for supporting a liquid crystal box which is to be integrally assembled with the backlight module; a light bar provided between the light guiding plate and the supporting block; and a light bar circuit board electrically connected with the light bar for controlling illumination of the light bar.

In the backlight module, the supporting block is attached to the edge portion of the backplate though an adhesive.

In the backlight module, at least a portion of the light bar circuit board is disposed on the supporting block, and at least another portion of the light bar circuit board is disposed on the light guiding plate.

In the backlight module, he supporting block supports the liquid crystal box to be assembled with the backlight module through the light bar circuit board.

In the backlight module, the light bar circuit board is disposed on the edge portion of the backplate, and the supporting block is disposed on the light bar circuit board.

In the backlight module, the supporting block and the backplate cooperatively form a semi-closed chamber, where the reflective plate, the light guiding plate, the optical film, the light bar, and the light bar circuit board are disposed in the chamber.

In the backlight module, a heat conductive glue is provided between the supporting block and the light bar, the heat conductive glue is utilized to dissipate heat produced by the light bar to the supporting block, and the supporting block dissipates the heat produced by the light bar to an outside of the backlight module.

In the backlight module, the supporting block has a flat shape, and the supporting block is perpendicular to the backplate.

In the backlight module, a first supporting element is disposed between the supporting block and the light bar circuit board, the first supporting element is provided to fill a first gap formed between the supporting block and the light bar circuit board, a second supporting element is disposed between the light bar circuit board and the light guiding plate, and the second supporting element is provided to fill a second gap formed between the light bar circuit board and the light guiding plate.

A display device comprises a liquid crystal box; and a backlight module assembled integrally with the liquid crystal box, the backlight module comprising: a backplate; a reflective plate disposed on the backplate; a light guiding plate disposed on the reflective plate; an optical film disposed on the light guiding plate; a supporting block detachably attached to an edge portion of the backplate, the supporting block provided for supporting a liquid crystal box which is to be integrally assembled with the backlight module; a light bar provided between the light guiding plate and the supporting block; and a light bar circuit board electrically connected with the light bar for controlling illumination of the light bar.

In the display device, the supporting block is attached to the edge portion of the backplate though an adhesive.

In the display device, at least a portion of the light bar circuit board is disposed on the supporting block, and at least another portion of the light bar circuit board is disposed on the light guiding plate.

In the display device, the supporting block supports the liquid crystal box to be assembled with the backlight module through the light bar circuit board.

In the display device, the light bar circuit board is disposed on the edge portion of the backplate, and the supporting block is disposed on the light bar circuit board.

In the display device, the supporting block and the backplate cooperatively form a semi-closed chamber, where the reflective plate, the light guiding plate, the optical film, the light bar, and the light bar circuit board are disposed in the chamber.

In the display device, a heat conductive glue is provided between the supporting block and the light bar, the heat conductive glue is utilized to dissipate heat produced by the light bar to the supporting block, and the supporting block dissipates the heat produced by the light bar to an outside of the backlight module.

In the display device, the supporting block has a flat shape, and the supporting block is perpendicular to the backplate.

In the display device, a first supporting element is disposed between the supporting block and the light bar circuit board, the first supporting element is provided to fill a first gap formed between the supporting block and the light bar circuit board, a second supporting element is disposed between the light bar circuit board and the light guiding plate, and the second supporting element is provided to fill a second gap formed between the light bar circuit board and the light guiding plate.

In comparison with conventional display devices, the present invention utilizes the supporting block to replace traditional block walls and plastic frame, and therefor is capable of reducing width of bezel areas of the backlight module, whereby fulfilling a slim bezel configuration.

DESCRIPTION OF PREFERRED EMBODIMENTS

As used in this specification the term "embodiment" means an instance, an example, or an illustration. In addition, for the articles in this specification and the appended claims, "a" or "an" in general can be interpreted as "one or more" unless specified otherwise or clear from context to determine the singular form.

Figure 1:
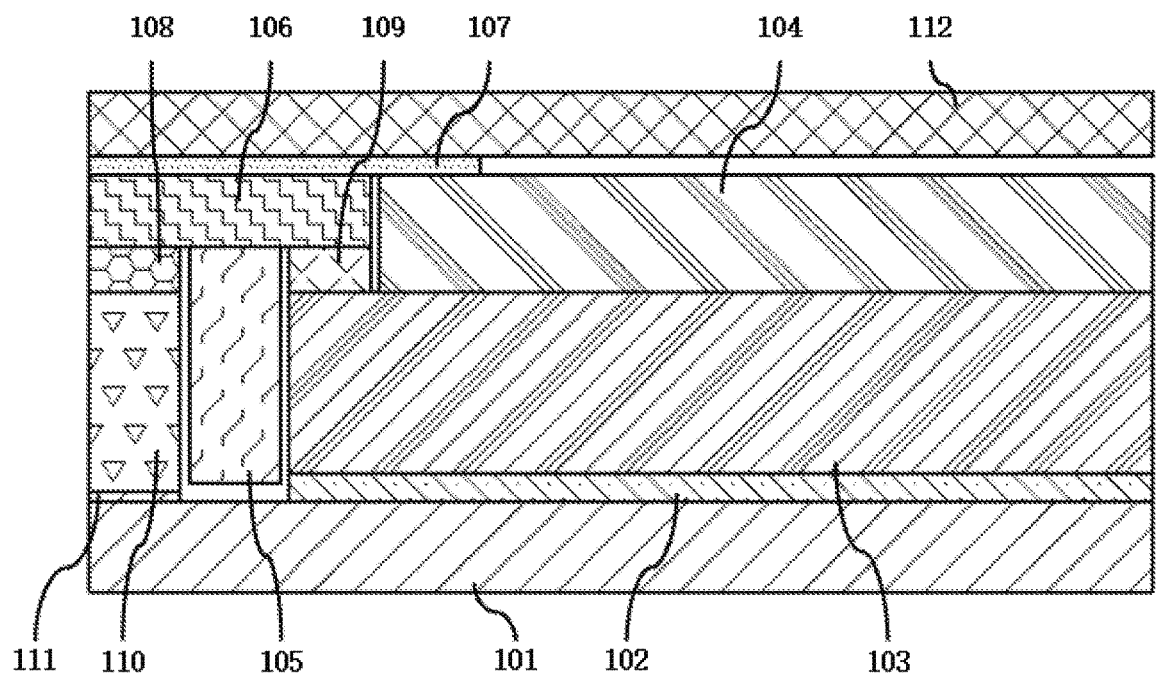
FIG. 1 is a schematic cross-sectional view of a display device in accordance with a first embodiment of the present invention.

Please refer to FIG. 1, which is a schematic cross-sectional view of a display device in accordance with a first embodiment of the present invention.

The display device of the present invention comprises a liquid crystal box 112 and a backlight module. The backlight module and the liquid crystal box 112 are assembled into a unified piece, and the backlight module and the crystal liquid box 112 are fixed together by an adhesive 107.

The backlight module comprises a backplate 101, a reflective plate 102, a light guiding plate 103, an optical film 104, a supporting block 110, a light bar 105, and a light bar circuit board 106.

The reflective plate 102 is disposed on the backplate 101. Specifically, the reflective plate 102 is disposed on an inner surface of the backplate 101 (facing the light guiding plate 103). A surface of the reflective plate 102 facing the light guiding plate 103 forms a first projection array or a first recess array. The first projection array includes at least two first projections, the first recess array includes at least two first recesses, and the at least two first projections or the at least two first recesses are configured to diffuse light emitted by the light bar 105.

The light guiding plate 103 is disposed on the reflective plate 102. A surface of the light guiding plate 103 facing the reflective plate 102 forms a second projection array or a second recess array. The second recess array includes at least two second recesses, the second projection array includes at least two second projections. The second recesses correspond to the first projections in size and shape. Locations of the second recesses on the light guiding plate 103 correspond to locations of the first projections on the reflective plate 102. The second projections correspond to the first recesses in size and shape, and locations of the second projections on the light guiding plate 103 correspond to locations of the first recesses on the reflective plate 102. The second recesses engage with the first projections, and the second projections engage with the first recesses.

The optical film 104 is disposed on the light guiding plate 103.

The supporting block 110 is detachably attached to an edge portion of the backplate 101 and is provided for supporting the liquid crystal box 112 which is to be integrally assembled with the backlight module. The supporting block 110 and the backplate 101 cooperatively form a semi-closed chamber, where the reflective plate 102, the light guiding plate 103, the optical film 104, the light bar 105, and the light bar circuit board 106 are disposed in the chamber.

The light bar 105 is provided between the light guiding plate 103 and the supporting block 110. The light bar 105 emits light toward a side of the light guiding plate 103. A heat conductive glue is provided between the supporting block 110 and the light bar 105, the heat conductive glue is utilized to dissipate heat produced by the light bar 105 to the supporting block 110, and the supporting block 110 dissipates the heat produced by the light bar 105 to an outside of the backlight module. The supporting block 110 has a flat shape, and the supporting block 110 is perpendicular to the backplate 101.

The light bar circuit board 106 is electrically connected with the light bar 105 for controlling illumination of the light bar 105.

In the present embodiment, the supporting block 110 is attached to the edge portion of the backplate 101 though an adhesive 111.

At least a portion of the light bar circuit board 106 is disposed on the supporting block 110, and at least another portion of the light bar circuit board 106 is disposed on the light guiding plate 103.

A first supporting element 108 is disposed between the supporting block 110 and the light bar circuit board 106 in such a way that the first supporting element 108 is provided to fill a first gap formed between the supporting block 110 and the light bar circuit board 106. A second supporting element 109 is disposed between the light bar circuit board 106 and the light guiding plate 103 in such a way that the second supporting element 109 is provided to fill a second gap formed between the light bar circuit board 106 and the light guiding plate 103.

The adhesive 107 is provided on the light bar circuit board 106 and at least a portion of the optical film 104.

The supporting block 110 supports the liquid crystal box 112 to be assembled with the backlight module through the light bar circuit board 106.

Figure 2:
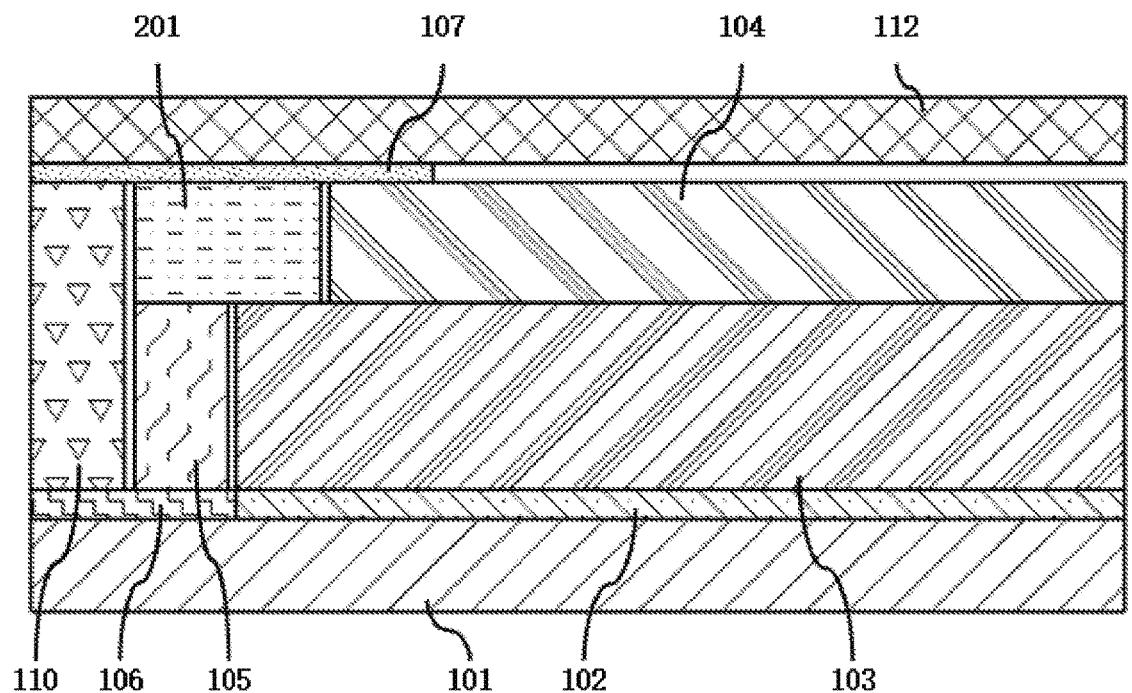
FIG. 2 is a schematic cross-sectional view of the display device in accordance with a second embodiment of the present invention.

Please refer to FIG. 2, which is a schematic cross-sectional view of the display device in accordance with a second embodiment of the present invention. Differences between the present embodiment and the first embodiment are as follows: the light bar circuit board 106 is disposed on the edge portion of the backplate 101, and the supporting block 110 is disposed on the light bar circuit board 106.

Specifically, the light bar circuit board 106 is fixed on the edge portion of the backplate 101, and the supporting block 110 is disposed on the light bar circuit board 106 far away from the reflective plate 102.

The light bar 105 is disposed on the light bar circuit board 106 close to the reflective plate 102.

At least a portion of the twin adhesive 107 is attached to the supporting block 110, and at least another portion of the twin adhesive 107 is attached to the optical film 104.

The display device of the present embodiment further comprises a light reflection plate 201. The light reflection plate 201 is disposed on at least a portion of the light bar 105 and at least a portion of the light guiding plate 103. The light reflection plate 201 is provided to reflect light emitted by the light bar 105 to the light guiding plate 103, so that the light emitted by the light bar 105 is concentrated in the light guiding plate 103 as an inlet light.

In comparison with conventional display devices, the present invention utilizes the supporting block to replace traditional block walls and plastic frame, and therefor is capable of reducing width of bezel areas of the backlight module, whereby fulfilling a slim bezel configuration.

It is understood that the invention may be embodied in other forms within the scope of the claims. Thus the present examples and embodiments are to be considered in all respects as illustrative, and not restrictive, of the invention defined by the claims.

What is claimed is:

1. A backlight module, comprising:
   a backplate;
   a reflective plate disposed on the backplate;
   a light guiding plate disposed on the reflective plate;
   an optical film disposed on the light guiding plate;
   a supporting block detachably attached to an edge portion of the backplate, the supporting block provided for supporting a liquid crystal box which is to be integrally assembled with the backlight module;
   a light bar provided between the light guiding plate and the supporting block;
   a light bar circuit board electrically connected with the light bar for controlling illumination of the light bar;
   the supporting block attached to the edge portion of the backplate though an adhesive;
   the light bar circuit board disposed on the edge portion of the backplate, and the supporting block disposed on the light bar circuit board;
   the supporting block and the backplate cooperatively forming a semi-closed chamber, wherein the reflective plate, the light guiding plate, the optical film, the light bar, and the light bar circuit board are disposed in the chamber; and
   the reflective plate disposed on an inner surface of the backplate.

2. The backlight module of claim 1, wherein at least a portion of the light bar circuit board is disposed on the supporting block, and at least another portion of the light bar circuit board is disposed on the light guiding plate.

* * * * *